US009299522B2

(12) United States Patent
Sudhakar et al.

(10) Patent No.: US 9,299,522 B2
(45) Date of Patent: Mar. 29, 2016

(54) SHUTTER LOCKING MECHANISM FOR CIRCUIT BREAKER ASSEMBLY

(71) Applicant: General Electric Company, Schenectady, NY (US)

(72) Inventors: Sapuram Sudhakar, Hyderabad (IN); Wolfgang Meyer-Haack, Neumunster (DE); Janakiraman Narayanan, Secunderabad (IN); Piotr Pawel Honkisz, Bielsko-Biala (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 591 days.

(21) Appl. No.: 13/630,349

(22) Filed: Sep. 28, 2012

(65) Prior Publication Data

US 2014/0090963 A1   Apr. 3, 2014

(51) Int. Cl.
| | | |
|---|---|---|
| *H01H 9/22* | (2006.01) | |
| *H01H 71/02* | (2006.01) | |
| *H02B 11/24* | (2006.01) | |
| *H02B 11/127* | (2006.01) | |
| *H02B 11/173* | (2006.01) | |
| *H02B 11/167* | (2006.01) | |

(52) U.S. Cl.
CPC ......... *H01H 71/0221* (2013.01); *H02B 11/127* (2013.01); *H02B 11/167* (2013.01); *H02B 11/173* (2013.01); *H02B 11/24* (2013.01)

(58) Field of Classification Search
CPC .... H02B 11/24; H02B 11/127; H02B 11/173; H02B 11/167; H01H 71/0221
USPC .......................... 361/617, 606, 607, 608, 609; 200/50.17, 50.21, 50.22
See application file for complete search history.

(56) References Cited

U.S. PATENT DOCUMENTS

| | | | | |
|---|---|---|---|---|
| 3,201,551 | A | * | 8/1965 | Mercier ........................... 218/23 |
| 3,610,850 | A | * | 10/1971 | Eichelberger .............. 200/50.21 |
| 3,778,568 | A | * | 12/1973 | Wilson ........................ 200/50.22 |
| 4,146,915 | A | * | 3/1979 | Yosida .......................... 361/617 |
| 4,565,908 | A | * | 1/1986 | Bould ........................ 200/50.22 |
| 4,703,137 | A | * | 10/1987 | Bohnen et al. ............. 200/50.25 |
| 5,200,585 | A | * | 4/1993 | Davies et al. .............. 200/50.22 |
| 5,343,355 | A | * | 8/1994 | Ishikawa ....................... 361/617 |
| 5,635,690 | A | | 6/1997 | Knecht et al. |
| 6,028,272 | A | | 2/2000 | Akers |
| 6,031,192 | A | | 2/2000 | Liebetruth |
| 6,388,213 | B1 | | 5/2002 | Letient et al. |
| 7,091,432 | B2 | | 8/2006 | Schmidt et al. |
| 7,348,505 | B2 | | 3/2008 | Kashyap et al. |
| 7,440,259 | B1 | * | 10/2008 | Deylitz et al. ................. 361/617 |
| 7,821,775 | B2 | | 10/2010 | Narayanasamy et al. |
| 7,834,281 | B2 | | 11/2010 | Narayanan et al. |
| 7,869,194 | B2 | * | 1/2011 | Deylitz et al. ................. 361/647 |
| 7,903,393 | B2 | * | 3/2011 | Buxton et al. ................ 361/608 |
| 7,936,239 | B2 | | 5/2011 | Gopikrishnan Babu et al. |
| 7,943,873 | B2 | | 5/2011 | Gopikrishnan Babu et al. |
| 7,965,493 | B2 | * | 6/2011 | Leeman et al. ............... 361/608 |
| 2007/0137991 | A1 | * | 6/2007 | Kashyap et al. ........... 200/50.22 |
| 2011/0114458 | A1 | | 5/2011 | Lee |

* cited by examiner

*Primary Examiner* — Anatoly Vortman
(74) *Attorney, Agent, or Firm* — GE Global Patent Operation; Stephen G. Midgley

(57) ABSTRACT

In one embodiment, a shutter lock assembly for a circuit breaker cassette having a shutter coupled to a shutter rod is provided. The shutter lock assembly includes a lock plate assembly configured to couple to the circuit breaker cassette and an actuation mechanism having a first end coupled the lock plate assembly. The actuation mechanism is configured to actuate the lock plate assembly to lock the shutter of the circuit breaker cassette in a closed position.

15 Claims, 7 Drawing Sheets

SHUTTER LOCKING MECHANISM FOR CIRCUIT BREAKER ASSEMBLY

BACKGROUND OF THE INVENTION

The field of the invention relates generally to circuit breakers and more particularly, to a circuit breaker assembly having a shutter locking mechanism.

Generally, known circuit breakers include mechanical operating components that are mainly exposed to the environment. The circuit breaker includes main contacts, which are either opened to interrupt a path for electrical power traveling from an electrical power source to a load or closed to provide a path for the power to travel from the source to the load. Arc chambers are disposed in the housing and are used for extinguishing an arc generated while opening the contacts. A draw out type circuit breaker is movable to be separated from the power source and the load circuit in order to facilitate maintenance.

A cassette is a mounting accessory into which a circuit breaker may be installed. The cassette includes terminals that are connected to the main electrical supply lines. The cassette also includes shutters configured to cover the terminals, preventing contact with live terminals when the circuit breaker is withdrawn. The shutters move to allow the circuit breaker to be easily and rapidly connected to the terminals in the cassette. The cassette further includes a circuit breaker trip-free mechanism that sets the circuit breaker in a trip-free condition and a padlock that locks the shutters. However, setting the circuit breaker to a trip-free condition and locking the shutters requires actuating two separate assemblies.

BRIEF DESCRIPTION OF THE INVENTION

In one embodiment, a shutter lock assembly for a circuit breaker cassette having a shutter coupled to a shutter rod is provided. The shutter lock assembly includes a lock plate assembly configured to couple to the circuit breaker cassette and an actuation mechanism having a first end coupled the lock plate assembly. The actuation mechanism is configured to actuate the lock plate assembly to lock the shutter of the circuit breaker cassette in a closed position.

In another embodiment, a circuit breaker assembly configured to receive a circuit breaker is provided. The circuit breaker assembly includes a cassette, a shutter, and an actuator assembly coupled to the cassette. The actuator assembly is configured to substantially simultaneously lock the shutter in a closed position and set the circuit breaker in a trip-free condition.

In yet another embodiment, a circuit breaker assembly is provided. The circuit breaker assembly includes a cassette and a circuit breaker removably coupled to the cassette. The circuit breaker assembly further includes a shutter coupled to the cassette and configured to move between an open position enabling electrical contact with the circuit breaker and a closed position preventing electrical contact with the circuit breaker. The circuit breaker assembly further includes a trip-free actuator assembly configured to selectively set the circuit breaker in a trip-free condition and a shutter lock assembly configured to selectively lock the shutter in the closed position.

DETAILED DESCRIPTION OF THE INVENTION

The present disclosure provides an exemplary circuit breaker assembly that is operable to substantially simultaneously actuate two mechanical control systems. More particularly, a single user-actuated assembly locks the circuit breaker shutters in the closed position and simultaneously sets the circuit breaker trip-free condition. Thus, the single actuation assembly provides a quick and easy way to control two mechanical system operations with one action.

Figure 1:
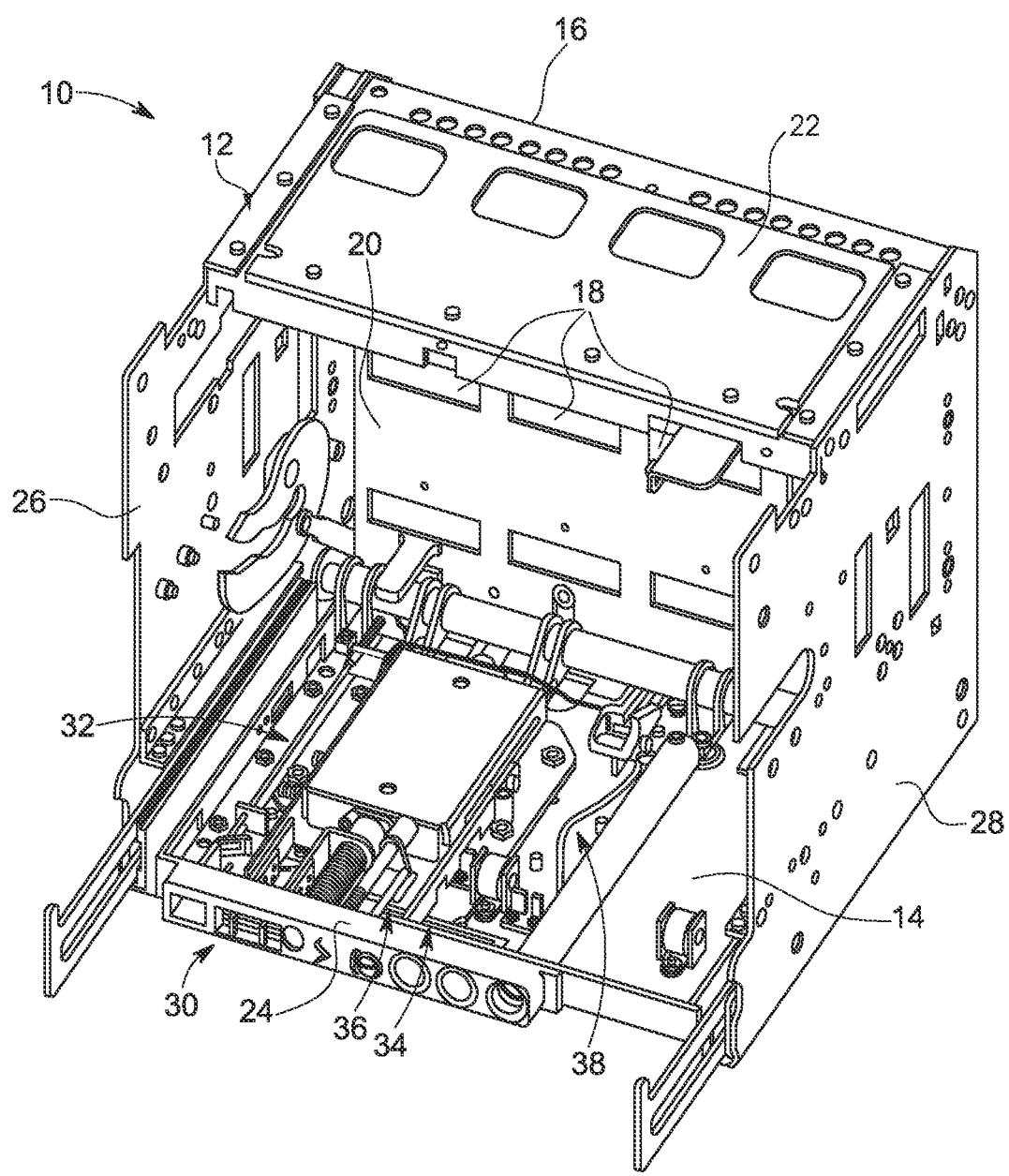
FIG. 1 is a perspective view of an exemplary circuit breaker cassette according to the present invention.

FIG. 1 illustrates an exemplary circuit breaker assembly 10 that includes a circuit breaker cassette 12 with a draw out circuit breaker removed. Circuit breaker cassette 12 includes a base panel 14, a rear panel 16, a rear shutter 18, a front shutter 20, a top panel 22, a front panel 24 and opposed side panels 26 and 28. Line terminals (not shown) are disposed within rear panel 16 and provide an electrical connection to main electrical supply lines (not shown). The line terminals are in physical and electrical connection with the circuit breaker when installed in cassette 12. Shutters 18 and 20 are disposed within rear panel 16, in front of the line terminals, and rear shutter 18 is configured to translate vertically or horizontally to either open or close, exposing or covering the line terminals, as described further below. FIG. 1 depicts a CLOSED shutter position in which the line terminals are not accessible by the circuit breaker.

In the exemplary embodiment, cassette 12 further includes a padlock assembly 30 and a shutter rod assembly 32, an actuator assembly 34, a trip-free assembly 36, and a shutter lock assembly 38. Padlock assembly 30 actuates shutter rod assembly 32 to control the locking and unlocking of shutters 18 and 20. Actuator assembly 34 substantially simultaneously actuates trip-free assembly 36 to set the circuit breaker in a trip-free condition and actuates shutter lock assembly 38 to lock shutters 18 and 20 in the CLOSED shutter position.

Figure 2:
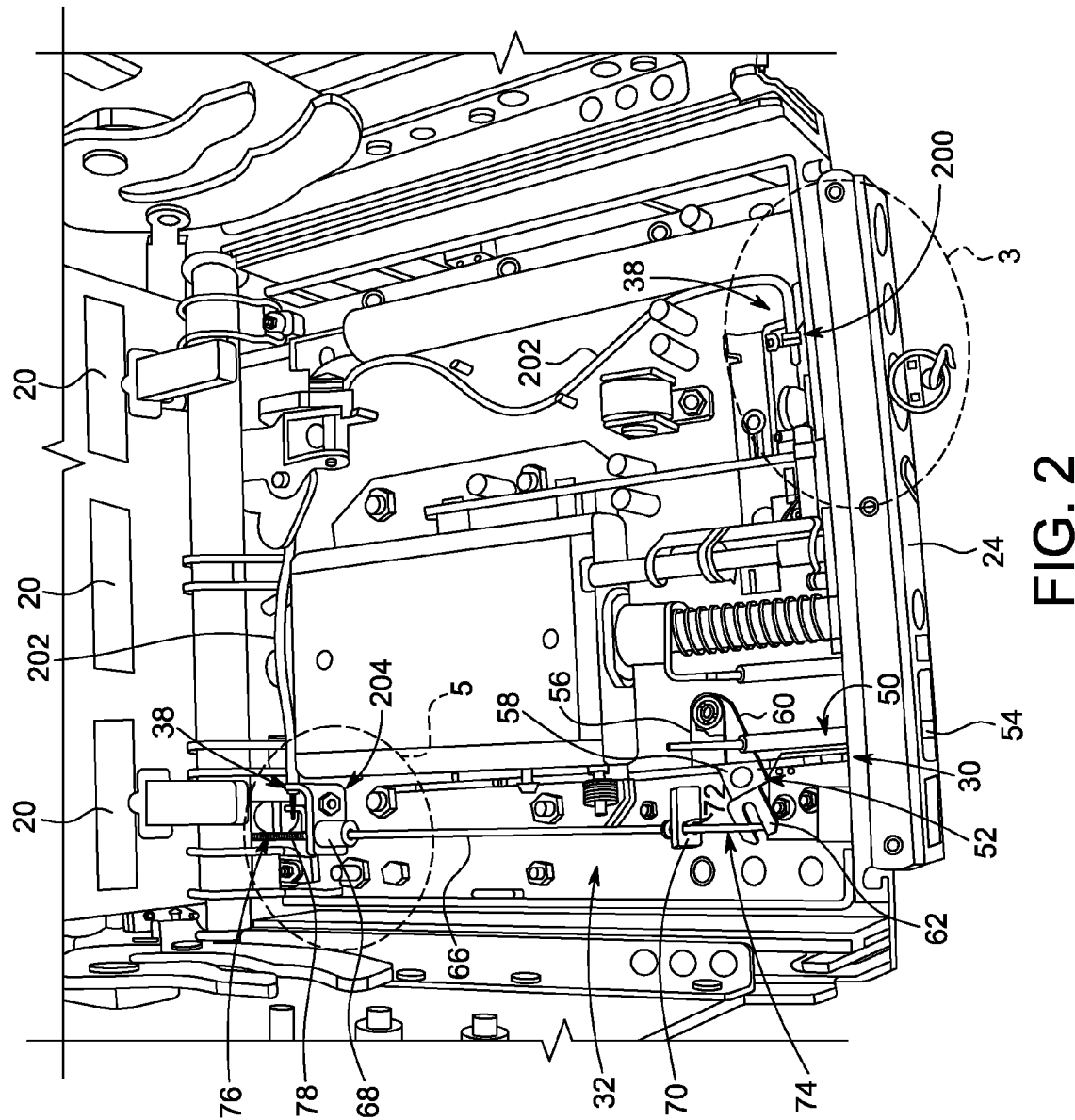
FIG. 2 is an enlarged view of a portion of the circuit breaker cassette of FIG. 1.

FIG. 2 illustrates an enlarged view of cassette base panel 14. Padlock assembly 30 includes a first padlock lever 50 slidably coupled to base panel 14 and a second padlock lever 52 rotatably coupled to base panel 14. First padlock lever 50 includes a first portion 54, which extends through front panel 24, and a second portion 56. Second padlock lever 52 includes a first portion 58 rotatably coupled to base panel 14, a second portion 60 rotatably coupled to first padlock lever second portion 56, and a U-shaped third portion 62 operatively associated with shutter rod assembly 32.

In the exemplary embodiment, shutter rod assembly 32 includes a shutter rod 66, a sleeve 68 coupled to shutter rod 66, and a front bracket 70 coupled to base panel 14. Front bracket 70 includes apertures 72 configured to receive and guide shutter rod 66. Shutter rod 66 includes a first portion 74 operatively associated with U-shaped portion 62 and a second portion 76 operatively associated with shutters 18 and 20. A spring 78 is positioned at second portion 76 to bias shutter rod 66 towards front panel 24.

Figure 3:
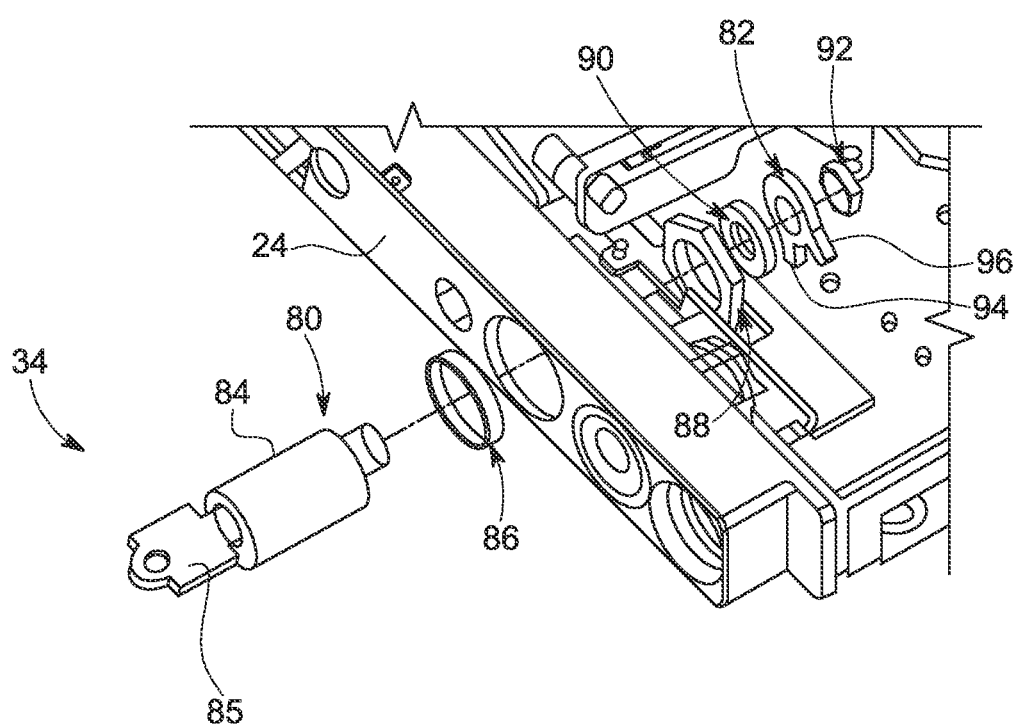
FIG. 3 is an enlarged exploded view of section 3 of the circuit breaker cassette of FIG. 2.
Figure 4:
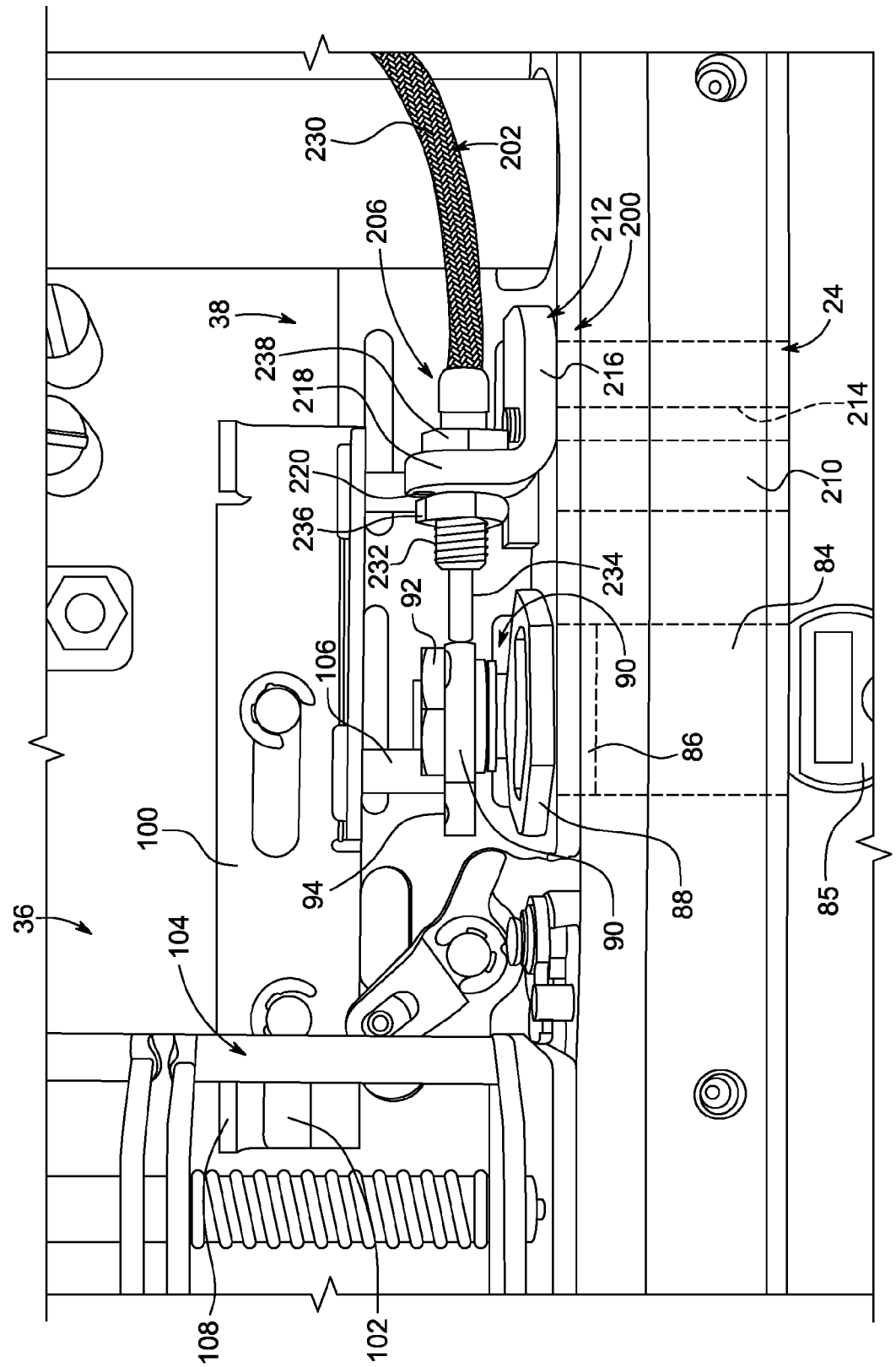
FIG. 4 is a top view of the circuit breaker cassette of FIG. 3.

FIG. 3 illustrates an exploded view of exemplary actuator assembly 34. Actuator assembly 34 includes a rotational device 80 and a cam 82 coupled to rotational device 80. In the exemplary embodiment, rotational device 80 is a lock 84. Alternatively, rotational device 80 may be any device that enables rotational movement of cam 82 as described herein. Lock 84 is positioned at least partially within front panel 24 against a spacer 86. Cam 82, a first nut 88, a cam spacer 90 and a second nut 92 are coupled to lock 84, as illustrated in FIG. 4. Cam 82 includes a first leg 94 operatively associated with trip-free assembly 36 and a second leg 96 operatively associated with shutter lock assembly 38 and trip-free assembly 36.

FIG. 4 illustrates a top view of exemplary trip-free assembly 36 that includes a slider 100 slidably coupled to base panel 14, and a mid-drive assembly 104 rotatably coupled to front panel 24. Slider 100 includes a first pin 106 operatively associated with cam first leg 94, and a raised portion 108 operatively associated with mid-drive assembly 104, which is operatively connected with the circuit breaker. Actuation of trip-free assembly 36 sets the circuit breaker in a trip-free condition. The trip-free condition prevents the circuit breaker main contact assembly (not shown) from closing following a tripping of the circuit breaker until the circuit breaker has been reset.

FIGS. 2-4 illustrate exemplary shutter lock assembly 38 that includes a retainer assembly 200, an actuation mechanism such as cable 202, and a lock plate assembly 204. Retainer assembly 200 is coupled to front panel 24, and lock plate assembly 204 is coupled to base panel 14. Alternatively, retainer assembly 200 and lock plate assembly 204 are coupled to any portion of cassette 12 that enables shutter lock assembly 38 to function as described herein. Cable 202 includes a first end 206 coupled to retainer assembly 200 and a second end 208 (FIG. 5) coupled to lock plate assembly 204.

In the exemplary embodiment, retainer assembly 200 includes a connector 210 extending through front panel 24, a retainer 212, and a fastener 214. In the exemplary embodiment, fastener 214 extends through connector 210 and couples retainer 212 to connector 210 and front panel 24. Retainer 212 includes a body 216 and a projection 218 that includes an aperture 220 configured to receive cable 202. Alternatively, retainer 212 is coupled to front panel 24 by welding, adhesive, or any other fastening means that enables retainer 212 to function as described herein.

In the exemplary embodiment, cable 202 is a Bowden cable that transmits mechanical force through an inner cable (not shown) inside an outer cable 230. Cable first end 206 includes a threaded portion 232 and a piston 234 coupled to the inner cable. Cable first end 206 extends through retainer aperture 220 and is secured to retainer 212 by nuts 236 and 238. Actuation of piston 234 transfers mechanical force to cable second end 208, as further described below.

Figure 5:
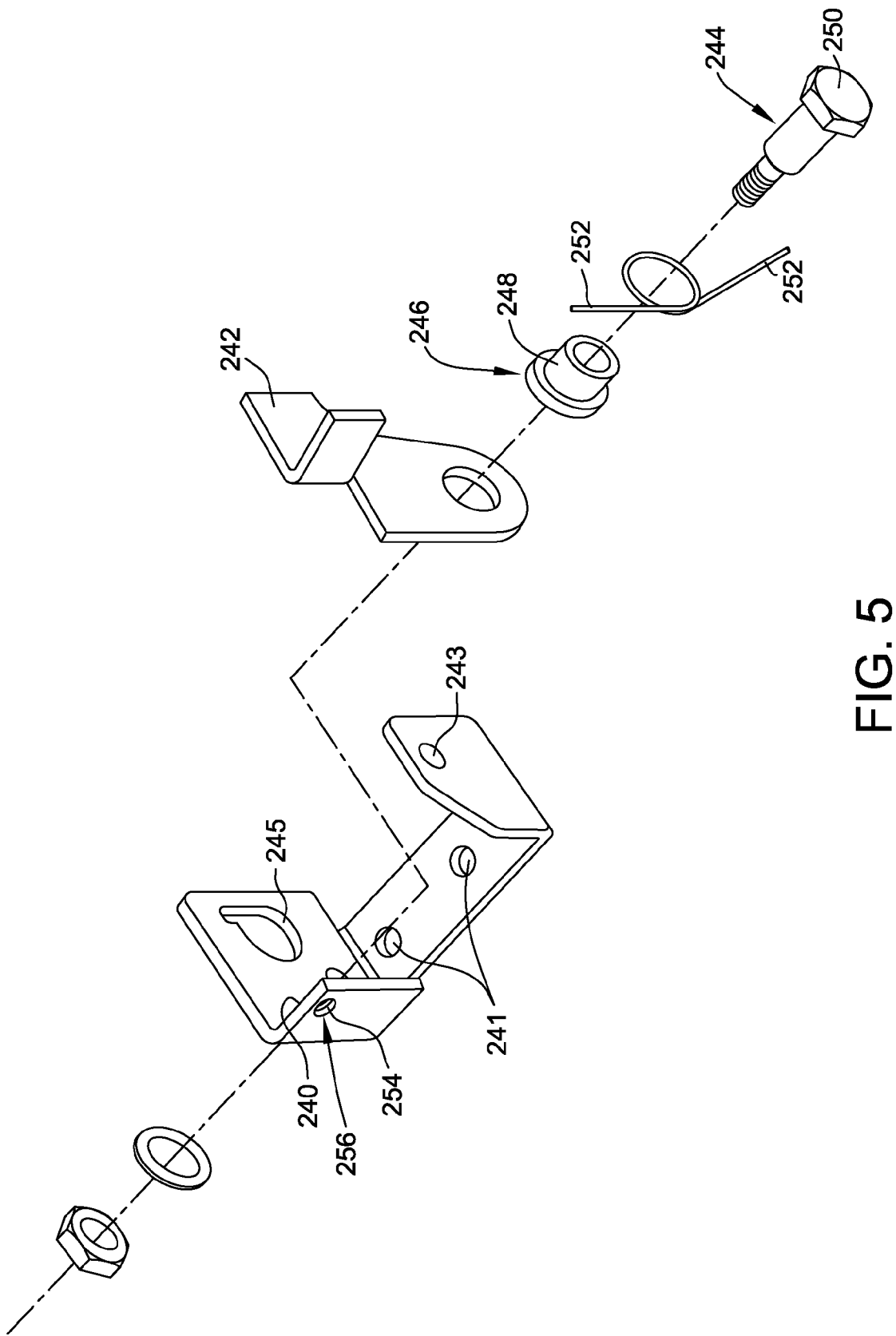
FIG. 5 is an enlarged view of section 5 of the circuit breaker cassette of FIG. 2 viewed from a rear panel of the cassette.
Figure 6:
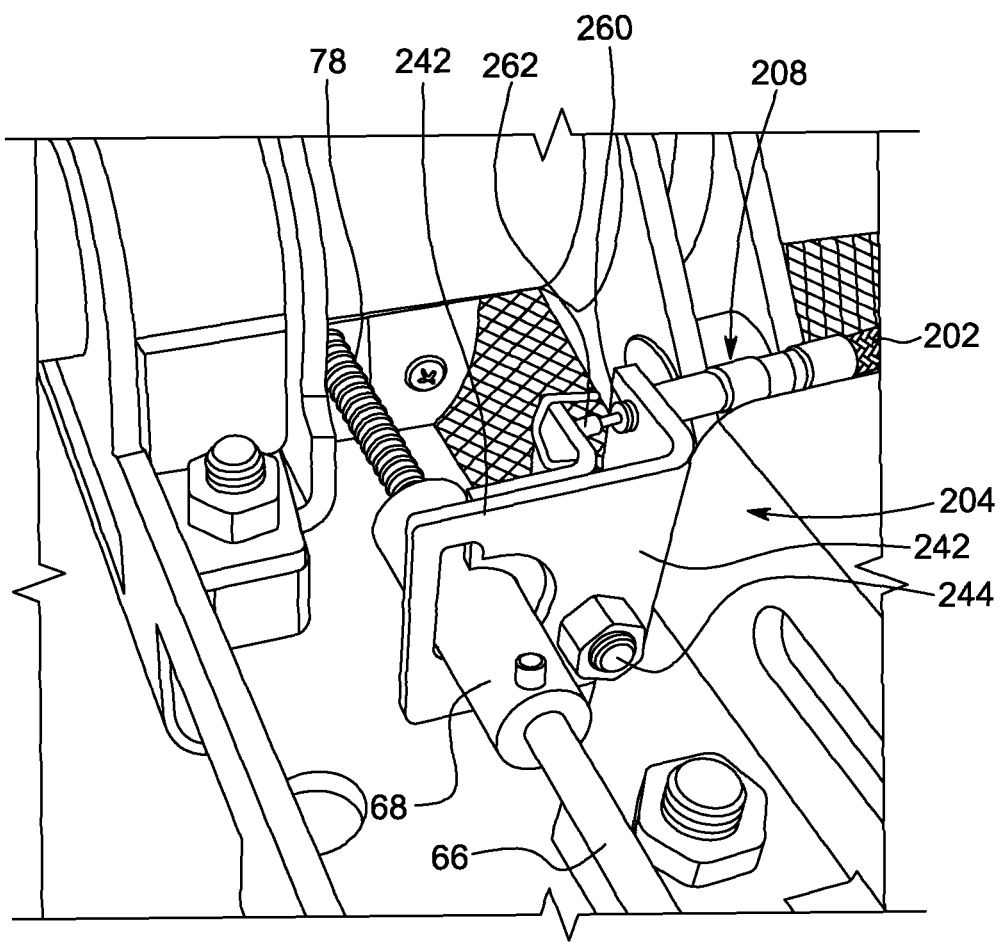
FIG. 6 is an enlarged view of section 5 of the circuit breaker cassette of FIG. 2 with a shutter rod in an unlocked position.
Figure 7:
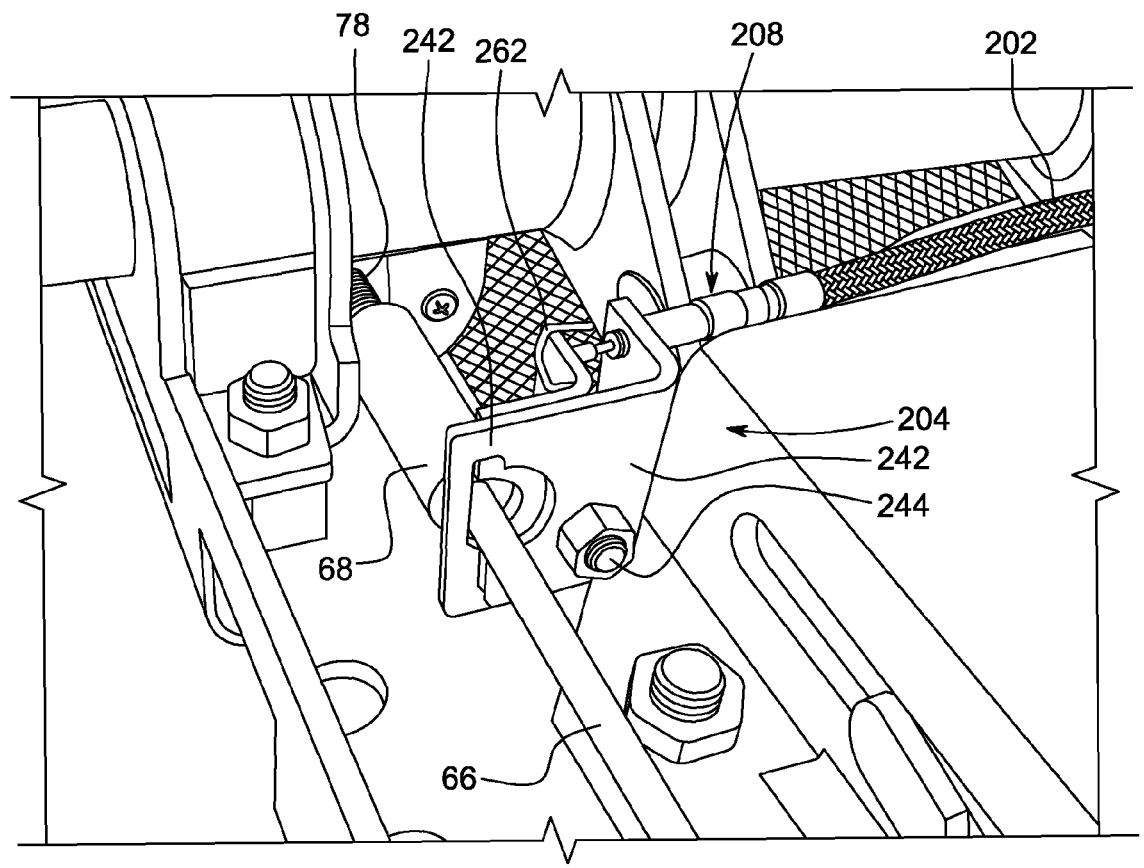
FIG. 7 is an enlarged view of section 5 of the circuit breaker cassette of FIG. 2 with the shutter rod in a locked position.

FIGS. 5-7 illustrate exemplary lock plate assembly 204 that includes a fixing bracket 240 and a blocking plate 242. Fixing bracket 240 is coupled to base panel 14 with a fastener (not shown) inserted through apertures 241. A pin 244 rotatably couples blocking plate 242 to fixing bracket 240. A sleeve 246 provides a surface 248 between blocking plate 242 and pin end 250 to receive a biasing mechanism 252 that biases blocking plate 242 in a first position (see FIG. 6). In the exemplary embodiment, biasing mechanism 252 is a spring such as a torsion spring. Alternatively, biasing mechanism 252 is any device that enables lock plate assembly 204 to function as described herein. Fixing bracket 240 includes a threaded inner edge 254 defining an aperture 256 configured to receive cable second end 208.

In the exemplary embodiment, cable second end 208 includes a threaded portion 260 and a piston 262 coupled to the inner cable (not shown). Threaded portion 260 is coupled to fixing bracket threaded inner edge 254 such that piston 262 is positioned for engagement with blocking plate 242. Actuation of piston 234 of cable first end 206 transfers mechanical force to piston 262 of cable second end 208.

During operation, first portion 54 of first padlock lever 50 is pulled away from front panel 24, causing first padlock lever 50 to translate along base panel 14 and rotate second padlock lever 52 about first portion 58. Rotation of second padlock lever 52 causes U-shaped third portion 62 to engage and translate shutter rod 66 to translate towards and into rear panel 16. In the exemplary embodiment, translation of shutter rod 66 towards and into rear panel 16 causes shutters 18 and 20 lock in the CLOSED position. Thus, actuation of padlock assembly 30 and shutter rod assembly 32 translates shutter rod 66 and sleeve 68 from a first position (see FIG. 6) to a second position (see FIG. 7).

Actuator assembly 34 actuates both trip-free assembly 36 and shutter lock assembly 38. In the exemplary embodiment, lock 84 is rotated counter-clockwise by a key 85, causing cam 82 to rotate counterclockwise. During rotation of lock 84, cam first leg 94 engages first pin 106 causing slider 100 to translate along base panel 14. Slider raised portion 108 moves into contact with mid-drive assembly 104 and causes mid-drive assembly 104 to rotate and set the circuit breaker (not shown) in a trip-free condition. Also during rotation of lock 84, cam second leg 96 engages piston 234 of cable 202, which transfers mechanical force to piston 262. Actuation of piston 234 causes piston 262 to engage and rotate blocking plate 242 from a first position, where blocking plate 242 does not engage sleeve 68 (see FIG. 6), to a second position, where blocking plate 242 engages and blocks sleeve 68 from translating towards front panel 24 (see FIG. 7). Thus, blocking plate 242 is rotated within the translation path of shutter rod 66 and sleeve 68 to maintain the shutter rod 66 in its second position and lock shutters 18 and 20 in the CLOSED position.

As described, an operator actuates padlock assembly 30 causing shutter rod assembly to lock shutters 18 and 20. Subsequently, the operator actuates actuator assembly 34 with key 85 to simultaneously actuate trip-free assembly 36 and shutter lock assembly 38. Actuation of trip-free assembly sets the circuit breaker in a trip-free condition and actuation of shutter lock assembly 38 locks shutter rod assembly 32 in position to maintain shutters 18 and 20 in a CLOSED position. The operator may then release padlock assembly 30 and remove key 85 to leave shutters 18 and 20 locked in a CLOSED position and the circuit breaker in a trip-free condition. Accordingly, the circuit breaker cassette described herein combines locking of the shutters and setting the circuit breaker trip-free condition with a single actuation assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shutter lock assembly for use with a circuit breaker cassette having a shutter coupled to a shutter rod adapted to move along a translation path, said shutter lock assembly comprising:
    a lock plate assembly comprising a fixing bracket coupled to the circuit breaker cassette, and a blocking plate rotatably coupled to said fixing bracket, said blocking plate rotatable into and out of the translation path of the shutter rod, wherein said blocking plate engages the shutter rod when disposed in the translation path of the shutter rod to prevent translation of the shutter rod; and
    an actuation mechanism having a first end coupled to said lock plate assembly, wherein said actuation mechanism actuates said lock plate assembly to lock the shutter of the circuit breaker cassette in a closed position.

2. The shutter lock assembly of claim 1, wherein said shutter lock assembly further comprises a retainer assembly coupled to the circuit breaker cassette, said retainer assembly coupled to a second end of said actuating mechanism.

3. The shutter lock assembly of claim 1, wherein said blocking plate is rotatable between a first position where said blocking plate is out of the translation path of the shutter rod and allows translation of the shutter rod in a first direction, and a second position where said blocking plate is within the translation path of the shutter rod and prevents translation of the shutter rod in said first direction.

4. The shutter lock assembly of claim 3, wherein the shutter rod includes a sleeve, said blocking plate contacts said sleeve when in the second position.

5. The shutter lock assembly of claim 3, wherein said lock plate assembly further comprises a biasing mechanism biasing said blocking plate in said first position.

6. The shutter lock assembly of claim 1, wherein said actuation mechanism is a Bowden cable.

7. The shutter lock assembly of claim 3, wherein said locking plate defines an aperture that receives the shutter rod, wherein said blocking plate at least partially blocks said aperture when in the second position.

8. A circuit breaker assembly for a removable circuit breaker, said circuit breaker assembly comprising:
    a cassette;
    a shutter;
    an actuator assembly coupled to said cassette, said actuator assembly substantially simultaneously locking said shutter in a closed position and setting the circuit breaker in a trip-free condition; and
    a shutter lock assembly coupled to said cassette, said shutter lock assembly selectively locking said shutter in the closed position, said actuator assembly actuating said shutter lock assembly;
    wherein said shutter lock assembly comprises a lock plate assembly and an actuation mechanism having a first end coupled to said lock plate assembly, wherein said actuation mechanism actuates said lock plate assembly to secure said shutter in said closed position; and
    wherein said actuator assembly comprises a rotational device and a cam coupled to said rotational device, wherein said rotational device selectively rotates to selectively engage said shutter lock assembly.

9. The circuit breaker of claim 8, further comprising a shutter rod actuation assembly coupled to said cassette, said shutter rod actuation assembly moving said shutter between an open and the closed position.

10. The circuit breaker assembly of claim 8, wherein said shutter lock assembly further comprises a retainer assembly coupled to said cassette and to a second end of said actuation mechanism.

11. The circuit breaker assembly of claim 8, wherein said lock plate assembly comprises a fixing bracket coupled to said cassette, and a blocking plate rotatably coupled to said fixing bracket.

12. The circuit breaker assembly of claim 11, wherein said shutter rod assembly comprises a shutter rod operatively coupled to said shutter, said blocking plate rotatable between a first position where said blocking plate allows translation of said shutter rod in a first direction and a second position where said blocking plate prevents translation of said shutter rod in said first direction.

13. The circuit breaker assembly of claim 12, wherein said shutter rod assembly further comprises a sleeve coupled to said shutter rod, wherein in said second position said blocking plate contacts said sleeve.

14. The circuit breaker assembly of claim 12, wherein said lock plate assembly further comprises a biasing mechanism biasing said blocking plate in said first position.

15. A circuit breaker assembly for a removable circuit breaker, said circuit breaker assembly comprising:
    a cassette;
    a shutter;
    an actuator assembly coupled to said cassette, said actuator assembly substantially simultaneously locking said shutter in a closed position and setting the circuit breaker in a trip-free condition;
    a shutter lock assembly coupled to said cassette, said shutter lock assembly selectively locking said shutter in the closed position, said actuator assembly actuating said shutter lock assembly; and
    a trip-free actuator assembly coupled to said cassette, said trip-free actuator assembly selectively setting the circuit breaker in the trip-free condition, said actuator assembly selectively actuating said trip-free actuator assembly;
    wherein said shutter lock assembly comprises a lock plate assembly and an actuation mechanism having a first end coupled to said lock plate assembly, wherein said actuation mechanism actuates said lock plate assembly to secure said shutter in said closed position; and
    wherein said actuator assembly further comprises a rotatable cam having a first leg and a second leg, said first leg selectively actuating said trip-free actuator assembly and said second leg selectively actuating said shutter lock assembly.

* * * * *